(12) United States Patent
Winston et al.

(10) Patent No.: US 6,196,825 B1
(45) Date of Patent: Mar. 6, 2001

(54) COMPRESSION MOLDING SYSTEM, APPARATUS AND METHOD

(75) Inventors: Michael E. Winston; Jarvis M. Pigge, both of Grove City, OH (US)

(73) Assignee: Core Materials, Inc., Columbus, OH (US)

( * ) Notice: Subject to any disclaimer, the term of this patent is extended or adjusted under 35 U.S.C. 154(b) by 0 days.

(21) Appl. No.: 09/218,077

(22) Filed: Dec. 22, 1998

(51) Int. Cl.$^7$ .................................................. B29C 43/32
(52) U.S. Cl. .......................... 425/195; 425/450.1; 29/466
(58) Field of Search ..................................... 425/193, 195, 425/450.1, 589, 153, 468, 595; 29/464, 466

(56) References Cited

U.S. PATENT DOCUMENTS

| | | | |
|---|---|---|---|
| 4,750,876 | * | 6/1988 | Lawson .................................. 425/406 |
| 4,861,254 | * | 8/1989 | Takeuchi et al. ..................... 425/190 |
| 5,096,404 | * | 3/1992 | Janos et al. ........................... 425/190 |
| 5,332,384 | * | 7/1994 | Abramat ................................ 425/522 |
| 5,744,173 | * | 4/1998 | Sterett ................................... 425/144 |

\* cited by examiner

*Primary Examiner*—Harold Pyon
*Assistant Examiner*—Donald Heckenberg
(74) *Attorney, Agent, or Firm*—Vorys, Sater, Seymour and Pease LLP

(57) ABSTRACT

A compression molding system has a pair of mold part holders with corner assemblies that perform guidance, stop and stabilization functions. Interchangeable heated mold parts lacking the aforesaid functions, are removably attached to the respective holders in such a manner that sheet metal core and cavity components of the mold parts are properly aligned. The guidance function of the holders guides the movement of the mold parts toward one another, and the stop function limits such movement to provide a predetermined space between the sheet metal components in order to form compression molding material therebetween to a desired shape and thickness. The stabilization function prevents longitudinal and transverse expansion of one of the mold parts relative to the other. The holders are designed to be attached to platens of a press.

11 Claims, 7 Drawing Sheets

COMPRESSION MOLDING SYSTEM, APPARATUS AND METHOD

BACKGROUND OF THE INVENTION

This invention is concerned with compression molding of sheet molding composites that form shaped body parts of vehicles, for example.

In standard construction of molds for compression molding of sheet molding composites, a cast or forged steel mold incorporates shaped mold surfaces and a heating system as well as guide pins, heel plates, and stop pads. Each part to be molded requires a dedicated mold incorporating all of the foregoing components, so the manufacture of such molds is highly specialized and expensive.

BRIEF DESCRIPTION OF THE INVENTION

The present invention provides compression molding system, apparatus and method that are simpler and less costly and that has the additional advantage of interchangeability of molds. In the invention, mold part holders incorporate components for performing, in a unique manner, functions previously performed by guide pins, heel plates, and stop pads of standard molds. New, interchangeable mold parts, lacking those functions, are removably attached to the holders. Each of the mold parts preferably comprises a sheet metal core or cavity component supported by a steel box structure that includes heating elements for heating the sheet metal component. The invention makes use of the discovery that, in low pressure compression molding, elaborate arrangements of a multiplicity of heel blocks spaced in two dimensions to stabilize high pressure molds are unnecessary, and that stabilization along with guidance and stop functions can be performed by simple corner assemblies of the mold part holders.

BRIEF DESCRIPTION OF THE DRAWINGS

The invention will be further described in conjunction with the accompanying drawings, which illustrate a preferred (best mode) embodiment, and wherein.

DETAILED DESCRIPTION OF THE INVENTION

Figure 1:
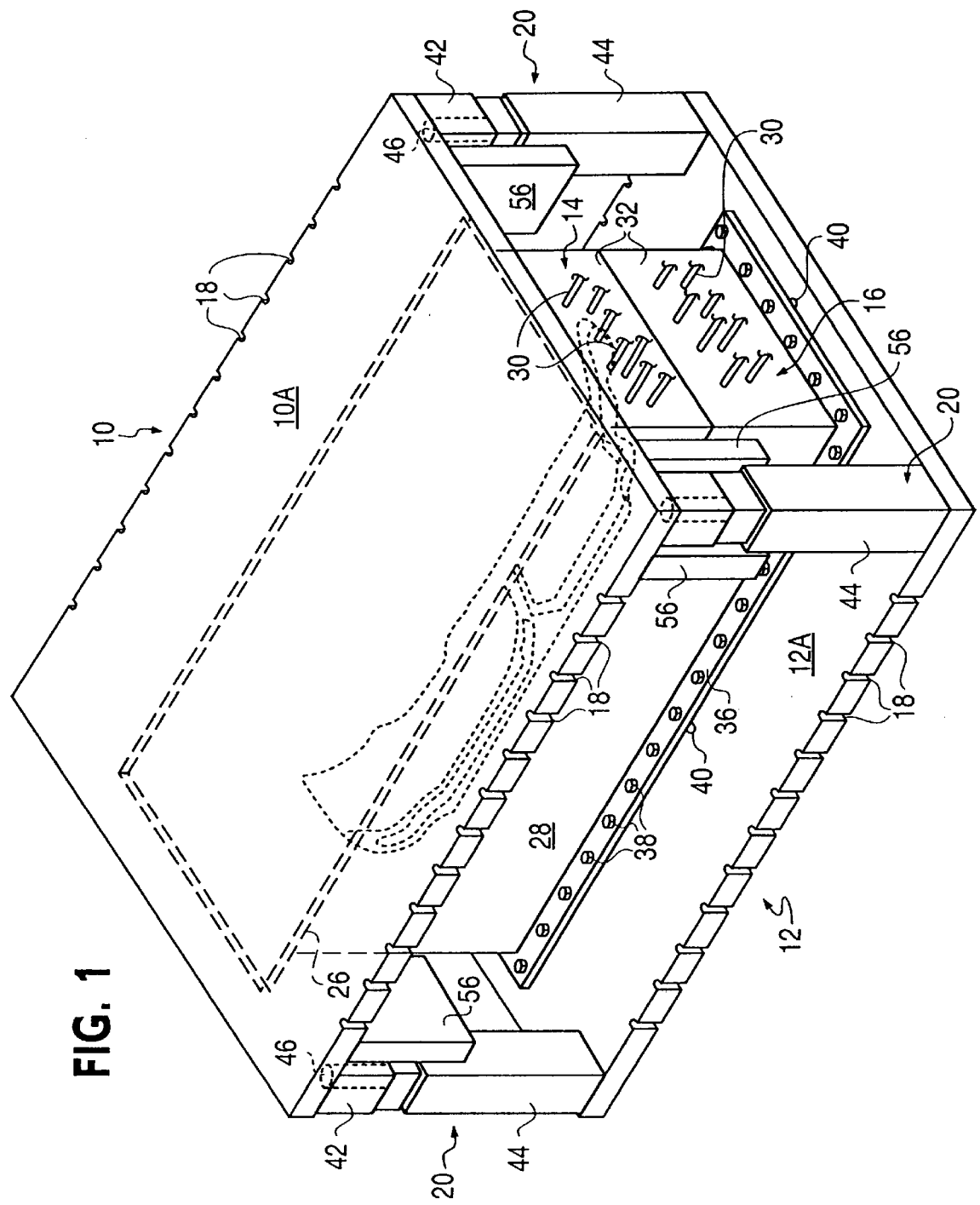
FIG. 1 is a perspective view of a compression molding system in accordance with the invention.

As shown in FIG. 1, a compression molding system in accordance with the invention comprises a pair of mold part holders 10 and 12 (sometimes referred to as shoes or dies) and a pair of mold parts 14 and 16 attached to respective holders. In a preferred form, the holders are upper and lower rectangular steel plates 10A and 12A having a series of notches 18 along opposite edges thereof that receive fasteners (e.g., bolts) for attaching the plates 10 and 12 to upper and lower platens, respectively, of a compression molding press (not shown). The holders have four corner assemblies 20 (three of which are shown in FIG. 1). The corner assemblies perform guidance, stop, and stabilization functions, making it unnecessary for the mold parts to perform these functions.

Each mold part comprises a sheet metal shell portion 22 or 24, preferably formed of nickel, supported on a steel box structure 26 or 28, which may have an egg crate type inner construction, the cavities of which may be filled with concrete. Tubular heating lines 30 extending under the nickel shell portions are routed to a manifold 32 mounted on an outside wall of the steel box, by which a heating fluid such as steam is supplied to the mold parts. The concrete filling insulates the back side of the nickel shell portions and ensures heat transfer to the material to be molded. One nickel shell portion defines a cavity, and the other a core, by which a part to be molded is shaped. Each shell portion may be 5 mm thick, for example.

Figure 3:
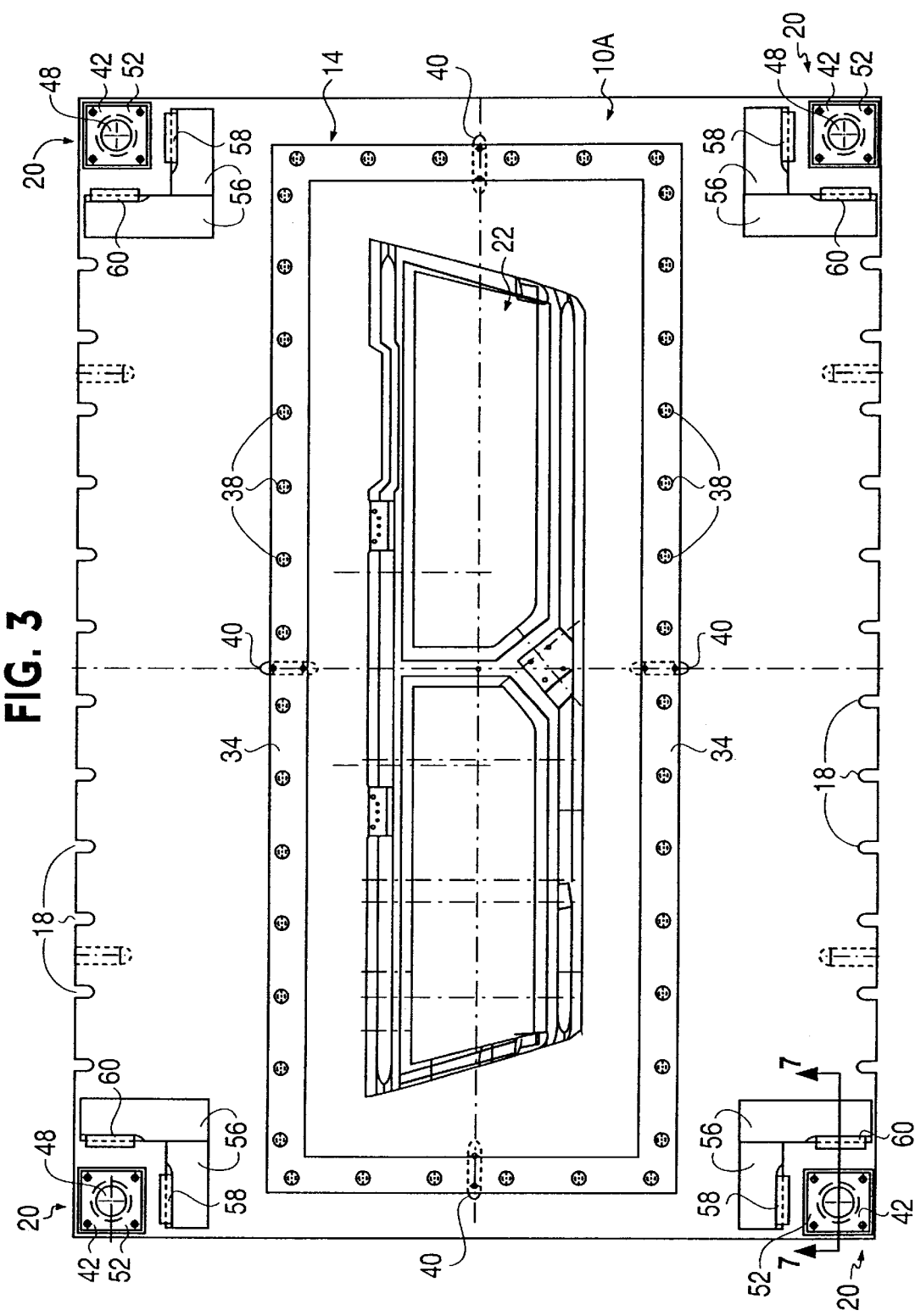
FIG. 3 is an inverted plan view showing an upper mold part holder and an attached mold part.
Figure 4:
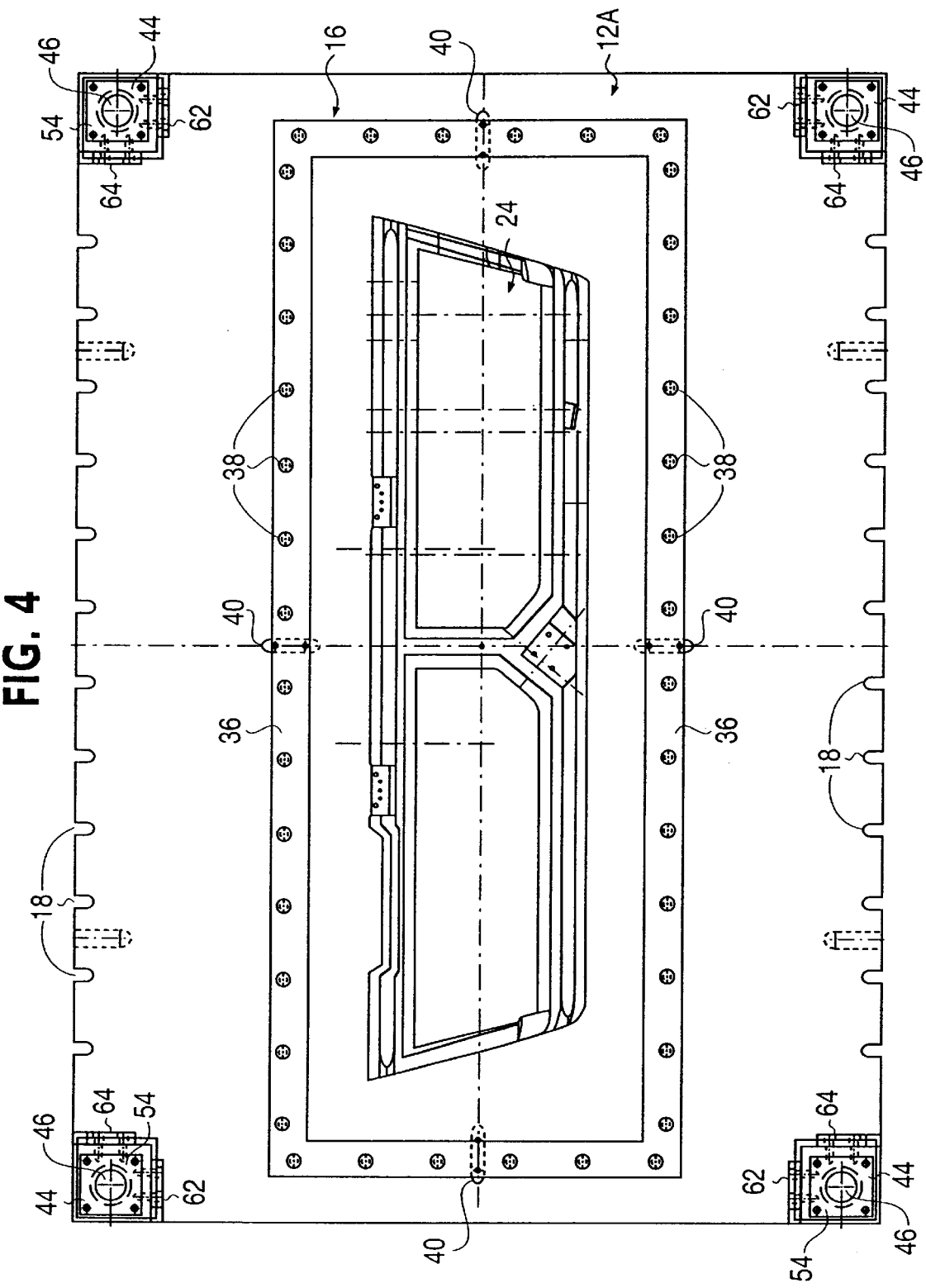
FIG. 4 is a plan view of a lower mold part holder and an attached mold part.
Figure 5:
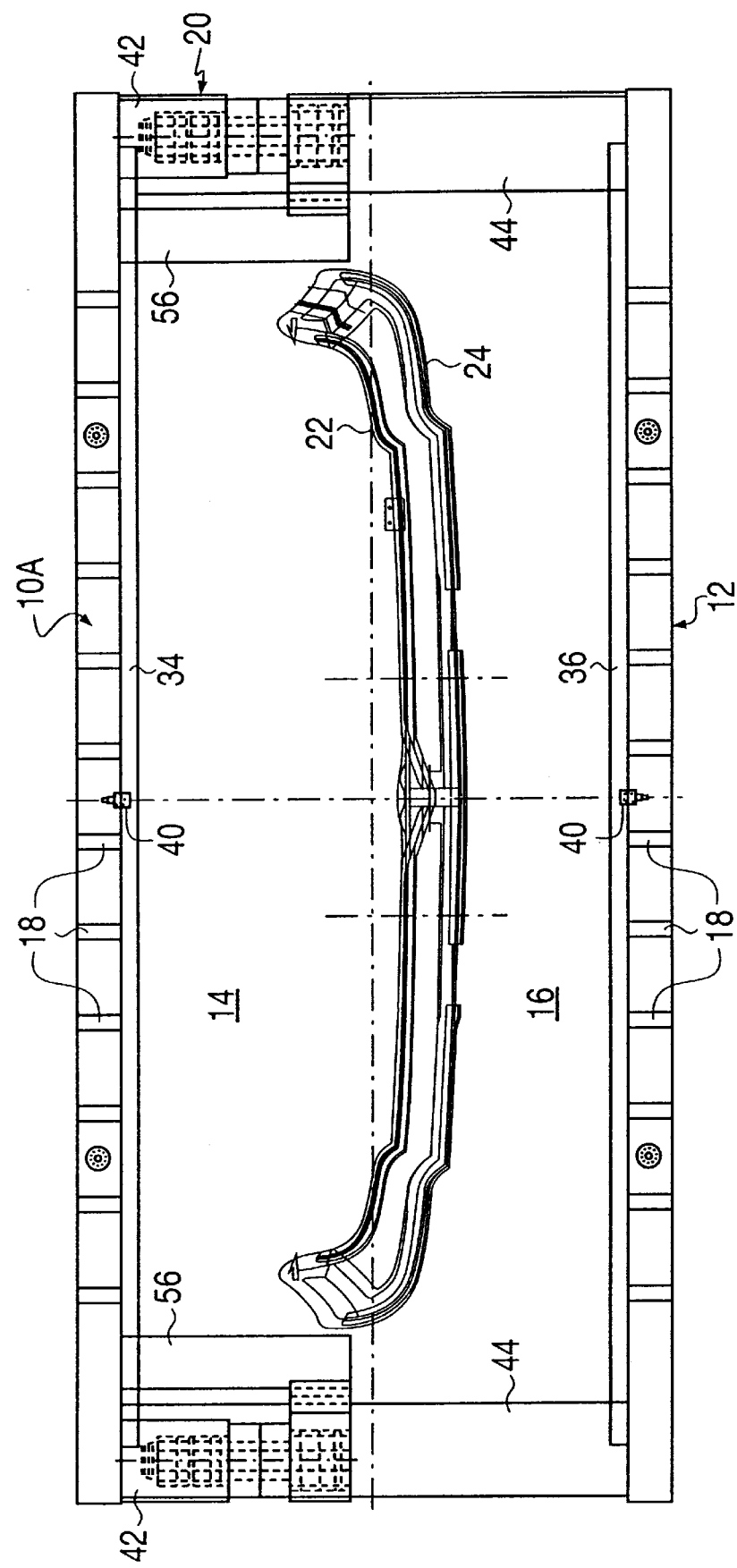
FIG. 5 is a side elevation view of the system of the invention.
Figure 6:
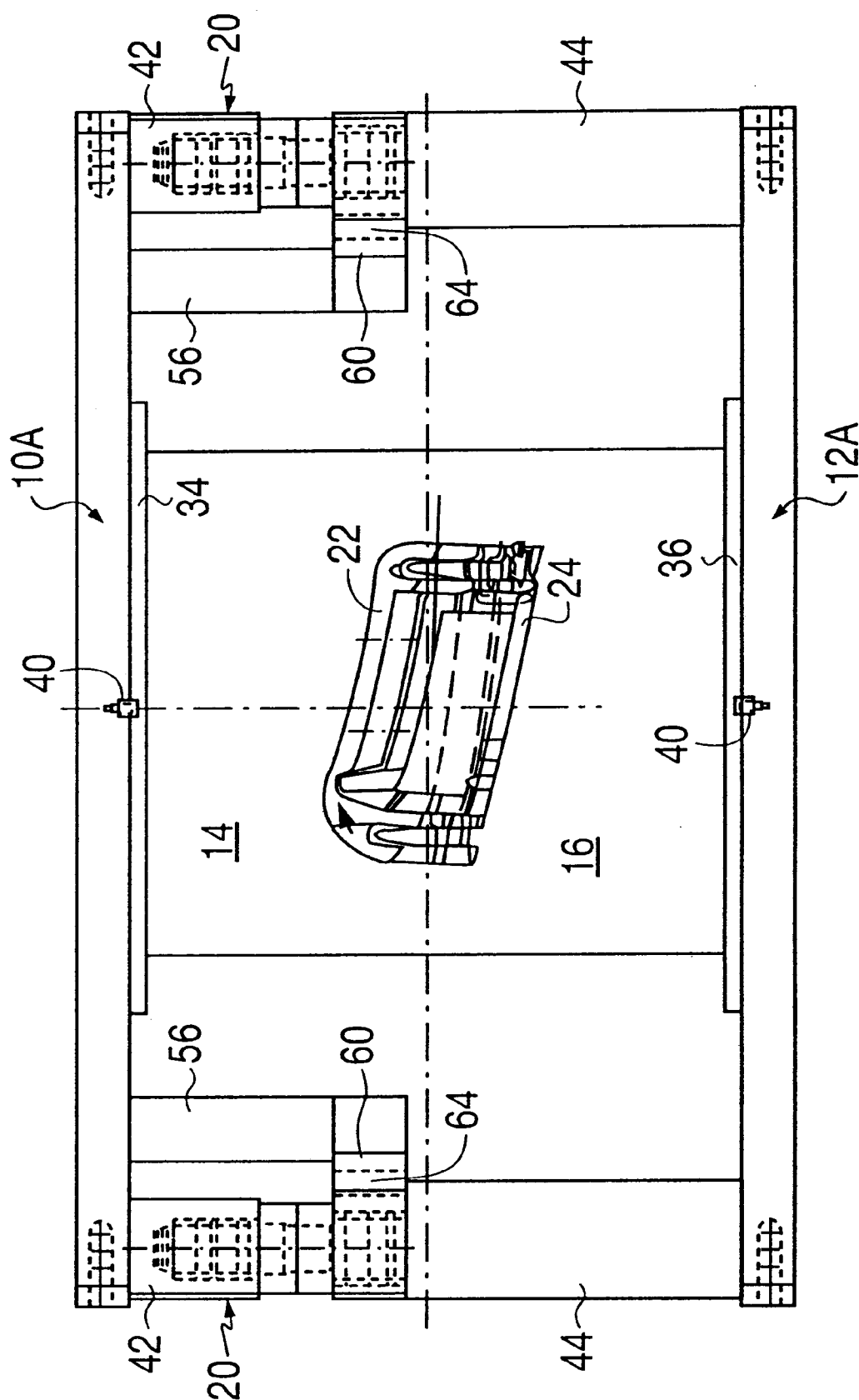
FIG. 6 is an end view of the system.

Each mold portion has a peripheral flange 34 or 36 (see FIGS. 1, 3, and 4) provided with a series of holes for receiving threaded fasteners 38, such as hex-head bolts that are inserted into corresponding threaded bores in the plates 10A and 12A of the holders. Furthermore, each mold part is keyed to the corresponding holder plate by keys and keyways 40, shown in FIGS. 3 and 4 for precise positioning of each mold part relative to its holder longitudinally and transversely (i.e. orthogonally). The keys may project from the holder plates into corresponding keyways formed in the flanges of the mold parts.

Figure 2:
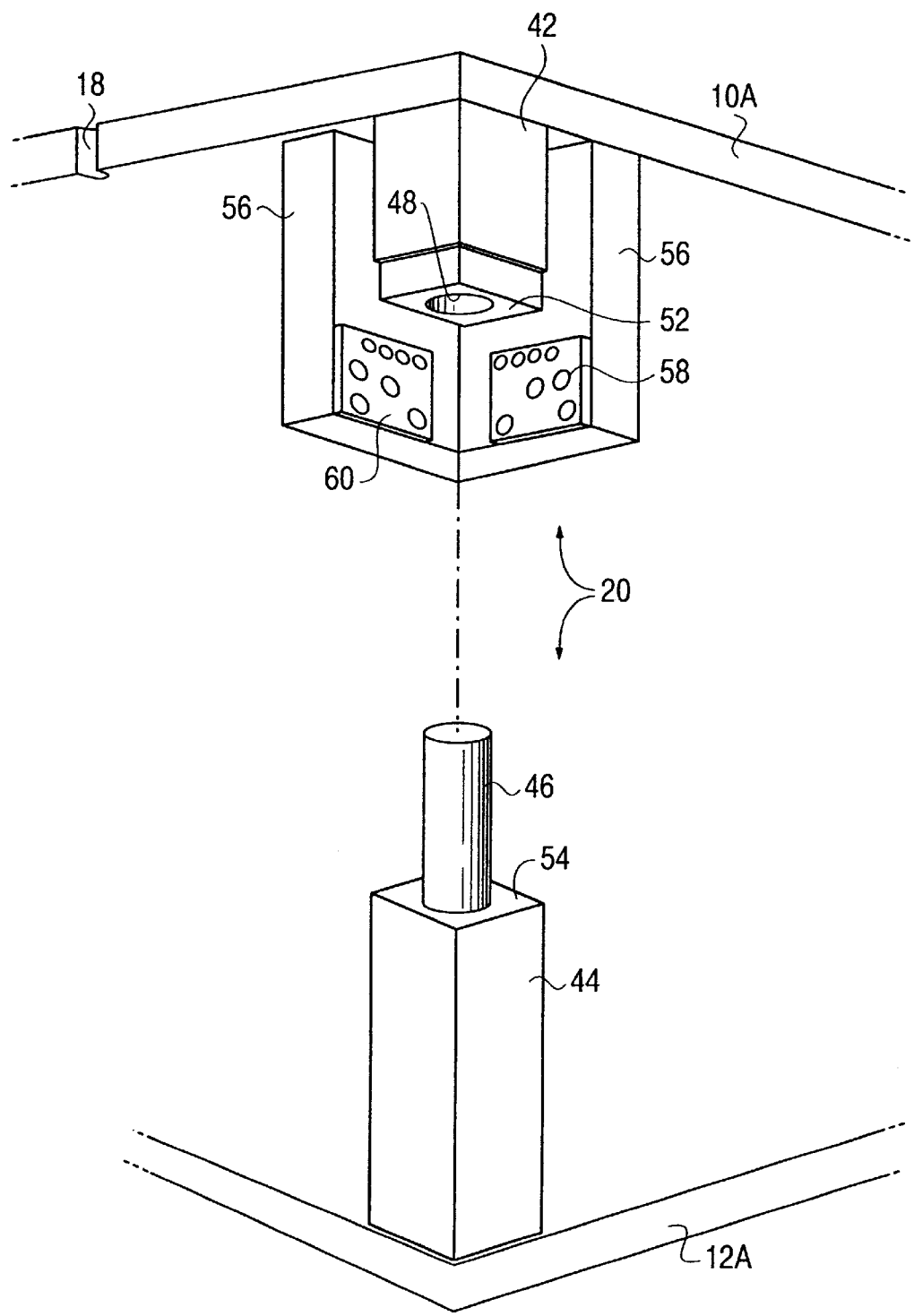
FIG. 2 is a fragmentary perspective view of a corner assembly.
Figure 7:
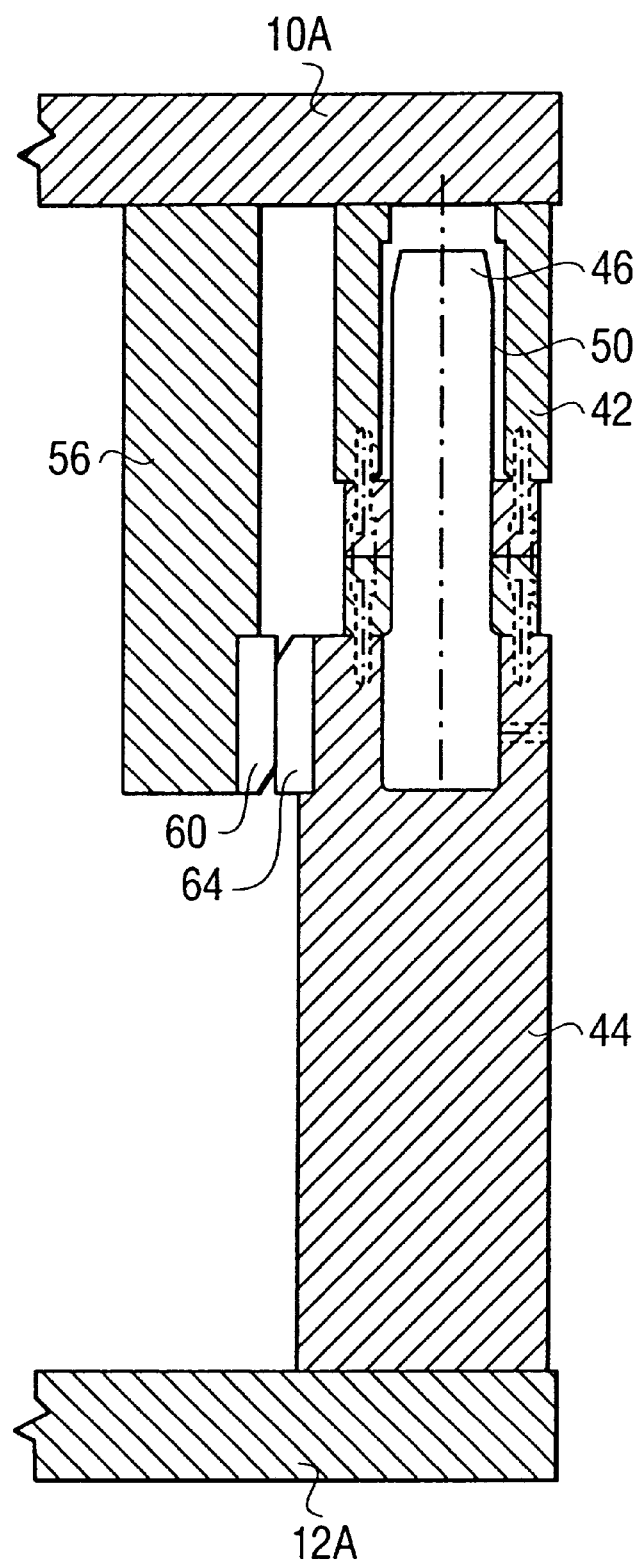
FIG. 7 is an enlarged sectional view taken along line 7—7 of FIG. 3 and showing parts of a corner assembly.

Each corner assembly 20 is constructed to provide all of the guidance, stop, and stabilization functions that are required. In the preferred form shown in FIG. 2, each corner assembly comprises cooperable post portions 42 and 44, one of which, 42, is attached (as by welding) to the upper holder plate 10A and the other of which, 44, is attached (as by welding) to the lower holder plate 12A. Projecting from the lower post portion 44 is a guide pin 46 that is received in a bore 48 of the upper post portion 42. FIG. 7 shows details of this pin and bore arrangement, the bore including a cylindrical bushing 50 into which the pin 46 fits. By virtue of the pin and bore arrangement, movement of the upper holder toward the lower holder is guided when the platens of the press are moved toward one another.

The stop function is performed by mating precisely machined surfaces 52 and 54 on the respective post portions, one of which surrounds the pin 46 and the other of which surrounds the opening of the bore 48. Movement of the holders 10 and 12 toward one another is stopped by engagement of the surfaces, thereby to set a predetermined spacing of the sheet metal mold surfaces for proper molding of molding material therebetween.

The stabilization function of each corner assembly is performed by heel blocks 56 that embrace an adjacent upper post portion 42 and that support longitudinally and transversely (orthogonally) oriented thrust pads 58 and 60 (see FIGS. 2 and 3) that cooperate with corresponding thrust pads 62 and 64 (see FIG. 4) on the lower post portion. When the stop surfaces 52 and 54 are engaged, the pads of the heel blocks are juxtaposed with and in contact with the corresponding pads of the lower post portion. Holes in the pads of the heel blocks are provided with a lubricant, such as graphite.

The purpose of the cooperating thrust pads is to stabilize the molds by preventing longitudinal and lateral expansion of one of the mold parts with respect to the other mold part. Such expansion can occur as the result of unbalanced forces due to the configuration of the nickel shell mold components. The invention provides sufficient stabilization in low pressure sheet molding, e.g., between 200 to 350 PSI in a press having effective tonnage between 100 and 400 tons, for example.

The invention is especially useful in producing molded body parts of vehicles, for example, from thermosetting sheet molding composite material that is formed, for example, from polyester resin, catalyst, filler, pigments, and chopped glass reinforcement. In use, a sheet of such material is placed in the open mold, and the mold parts are brought together for an appropriate period to compress, form, and set the molding material. The stops ensure the desired part thickness.

An important attribute of the invention is the interchangeability, in common holders, of mold parts that are simpler and less costly than comparable standard mold parts employed heretofore.

While a preferred embodiment of the invention has been shown and described, changes can be made without departing from the principles and spirit of the invention, the scope of which is defined in the accompanying claims.

The invention claimed is:

1. Apparatus for holding compression mold parts in a press, comprising:
    a pair of plates having four corners, the plates being constructed to be attached to corresponding press platens and to be attached to core and cavity mold parts, respectively, the plates having four corner assemblies at respective corners of the plates, each corner assembly including:
    cooperable post portions, one of which is attached to one of the plates and the other of which is attached to the other of the plates, one post portion having a pin extending toward the other post portion, and the other post portion having a bore that receives the pin, whereby the plates are guided for movement toward and away from one another,
    a pair of cooperable stop surfaces, one of which is provided on one post portion and the other of which is provided on the other post portion, the stop surfaces being constructed and disposed to engage one another to stop movement of the plates toward one another, whereby a space between the mold parts is set, and
    orthogonally oriented expansion-preventing members, including cooperable elements attached to respective plates, the cooperable elements being juxtaposed when the stop surfaces are engaged.

2. Apparatus according to claim 1, wherein the plates have a series of notches along opposite edges thereof for receiving fasteners to attach the plates to the platens of the press.

3. Apparatus according to claim 1, wherein the stop surfaces of each corner assembly comprise a pair of surfaces, one of which surrounds the pin and the other of which surrounds an opening to the bore.

4. Apparatus according to claim 1, wherein the expansion-preventing members of each corner assembly comprise blocks attached to one of the plates so as to embrace a post portion of that plate, the blocks being disposed to embrace the post portion of the other plate when the plates are brought together, the cooperable elements including orthogonally disposed surfaces on respective blocks positioned to contact surfaces on the post portion of the other plate when the stop surfaces are engaged.

5. A compression molding system comprising:
    a pair of mold part holders;
    a pair of cooperable mold parts, including a core mold part and a cavity mold part; and
    fasteners for attaching the core mold part to one of the holders and the cavity mold part to the other of the holders with the mold parts in alignment,
    wherein the holders have four corners, each corner having an assembly including:
    a portion attached to one holder and a cooperable portion attached to the other holder,
    a pin on one portion and a pin-receiving bore on the other portion, whereby movement of the holders toward one another, along with mold parts attached thereto, is guided,
    a pair of cooperable stop surfaces, one of which is on one portion and the other of which is on the other portion, the stop surfaces engaging one another to stop movement of the holders and the attached mold parts toward one another, and
    cooperable surfaces on the respective portions that prevent orthogonal expansion of one of the mold parts relative to the other.

6. Apparatus according to claim 5, wherein each of the mold parts comprises a box structure supporting a sheet metal mold element, the sheet metal mold elements being configured to form compression molding material therebetween into a desired shape.

7. Apparatus according to claim 6, wherein each of the mold parts includes heating elements for heating the sheet metal mold elements and the compression molding material.

8. Apparatus according to claim 5, wherein each of the holders and its attached mold part have cooperable alignment elements for precisely positioning each mold part with respect to its holder.

9. Apparatus according to claim 5, wherein each mold part is attached to its holder by a plurality of threaded fasteners inserted through holes in a flange of the mold part.

10. Apparatus according to claim 5, wherein each holder has a series of notches at opposite edges thereof for receiving fasteners to attach the holder to a corresponding platen of a press.

11. A method of manufacturing compression molding apparatus comprising:
    providing a pair of mold part holders having four corners provided with four corner assemblies, respectively, each of which performs guidance, stop, and orthogonal expansion-preventing functions, the guidance function guiding the movement of one holder toward the other, the stop function stopping such movement, and the expansion-preventing function preventing orthogonal expansion of one of the holders relative to the other;
    providing a pair of mold parts that lack said functions; and
    attaching the mold parts to the holders, respectively, such that the mold parts are in alignment with one another.

* * * * *